Aug. 7, 1934.  P. BELYAVIN  1,968,805
AUTOMATIC VALVE
Filed Oct. 6, 1933
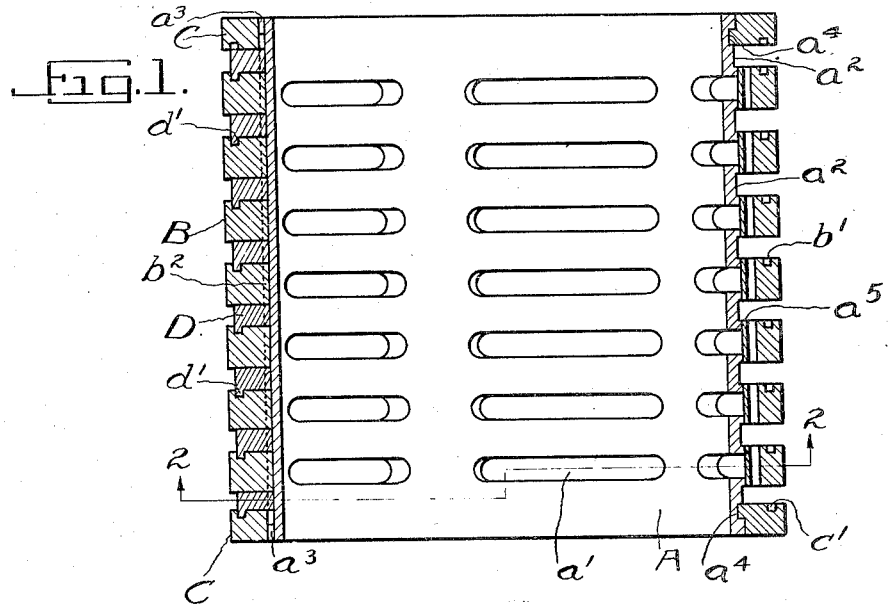
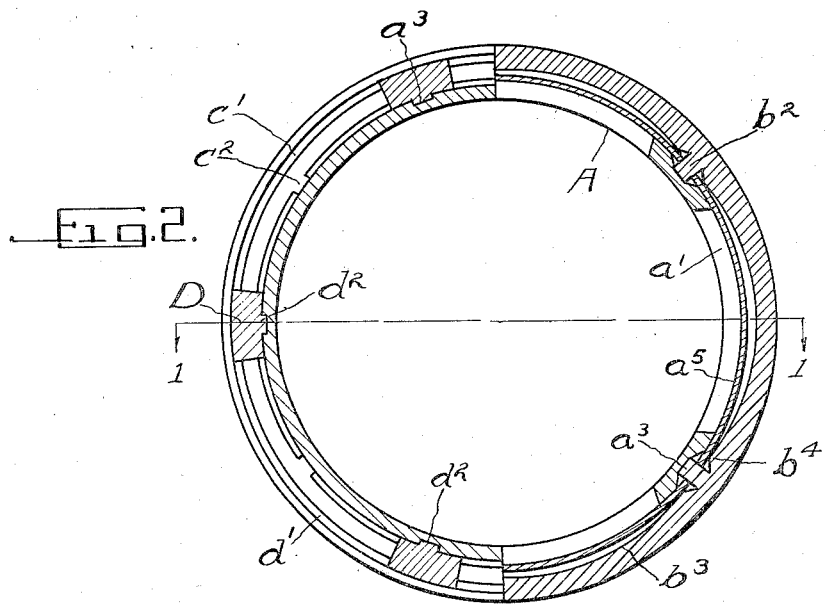
INVENTOR
P. Belyavin
BY J. Edw. Maybee
ATTY Patented Aug. 7, 1934

1,968,805

UNITED STATES PATENT OFFICE 1,968,805

AUTOMATIC VALVE

Paul Belyavin, London, England, assignor to Belfrost Diesels, Limited, Hamilton, Ontario, Canada Application October 6, 1933, Serial No. 692,382
In Great Britain October 17, 1932

8 Claims. (Cl. 277—60)

This invention relates to automatic valves of the flexible strip type, in which the flexible strips are arranged on a cylindrical surface, such as, for example, are described in my United States Patent 1,911,939 dated May 30th, 1933, and has for its chief object to improve the working of the valve, simplify its construction and assembling, and cheapen its manufacture.

The valve consists of an inner tube provided with rows of slots over which elastic strips, freely held at both ends, are flexed against arched parts of a series of outer stop rings arranged over the flexible strips and acting as checks or stops to the said strips when the latter are lifted off their seats by the pressure of passing fluid, with abutments provided in the said outer rings to prevent the lengthwise movements of the flexible strips and short segments, between these stop rings, acting as distance pieces, and also acting as side guides for the said flexible strips to prevent the strips from moving axially of the valve.

It has been found from experience, that if the said abutments and the distance pieces are arranged on the same cylindrical surface with the valve strips, and if any clearances are formed between these abutments and the distance pieces and the surface of the inner tube due to some inaccuracy in manufacture, the ends of the flexible strips may slip into these clearances, which results in fracturing of the strips.

In order to prevent these occurrences, I propose to sink both the said abutments and the distance pieces into specially provided grooves, below the outer surface of the inner tube.

It has also been found, that the dowel pins and the locating screws for holding the stop rings and distance pieces in position, shown in the prior patent hereinbefore referred to, are both difficult to assemble and expensive to manufacture. To avoid using these, I propose to have side grooves in the stop rings with corresponding projections on the segments forming the distance pieces or side guides, which slip into these side grooves and thus prevent these distance pieces from dropping out, and to provide inner projections forming lengthwise abutments for the strips on the stop rings positioned in grooves parallel to the axis of the inner tube, and corresponding inner projections on the distance pieces for the same purpose, to prevent the distance pieces and the rings from moving circumferentially.

In order to prevent the stop rings and distance pieces from slipping off the inner tube, lock rings are provided at each end of the valve, with inner projections which fit into the axial grooves on the inner tube, and if the lock ring is turned round some degrees, these inner projections pass out of the axial grooves into specially provided circumferential grooves of the same depth, thus preventing the lock ring from coming off the inner tube.

In order that this invention may be clearly understood and readily carried into effect, the same will be now described more fully with reference to the accompanying drawing in which Fig. 1 is a section through the centre line of the valve, along the line 1—1 in Fig. 2; and Fig. 2 a section perpendicular to the centre line, on the line 2—2 in Fig. 1.

A is the inner tube with rows of slots $a'$ over which elastic strips $a^5$ are flexed, acting as valves.

Between these rows of valve strips, circumferential grooves $a^2$ are provided in the inner tube, into which fit the distance pieces D, which also act as side guides for valve strips. These distance pieces have side projections $d'$ which fit into the corresponding side grooves $b'$ and $c'$ provided in stop rings B and lock rings C.

On the inner surface the distance pieces D have projections $d^2$ which fit into the axial grooves $a^3$, provided on the tube A.

The side projections $d'$ on distance pieces D, prevent them from dropping out, and the inner projections $d^2$, prevent them from moving circumferentially, while as they fit into the grooves $a^2$ they cannot move axially.

The axial grooves $a^3$ have about double the depth of the circumferential grooves $a^2$.

The stop rings B have stop surfaces $b^3$ which prevent the flexible strips from lifting too far. At each end of the curved stop surfaces $b^3$ fulcrum points $b^4$ are provided, upon which the ends of flexible strips will pivot.

The stop rings B have inner projections $b^2$, which also fit into the axial groove $a^3$.

The lock rings C have also inner projections $c^2$, which fit into the same axial grooves $a^3$, and when a lock ring C is set in in place with its projections $c^2$ in the grooves $a^3$, it can be turned round through an arc of several degrees, so that the inner projections $c^2$ passes into one of the circumferential grooves $a^4$ provided at each end of the inner tube A, which grooves $a^4$ have the same depth as the axial grooves $a^3$. By this bayonet joint arrangement the lock rings are locked in place on the inner tube A, and thus lock all stop rings and distance pieces in position.

The valve is assembled by fitting a locking ring in place on the inner tube, positioning distance pieces thereon, then fitting a stop ring on the distance pieces and so on till finally the second locking ring is locked in place.

What I claim as my invention is:

1. An automatic valve of the flexible strip type comprising an inner tube formed with a plurality of openings therethrough spaced longitudinally of the tube; a plurality of separate stop rings fitted on the inner tube each having a concave inner surface opposite one of the openings of the inner member and of shorter radius than that of the curved outer surface of the inner tube; a normally straight spring-valve strip arranged between each of said concave surfaces and the opposed opening in the inner tube; distance pieces positioning the stop rings and serving to position the ends of the spring-valve strips longitudinally of the device, the inner tube being provided with annular grooves into which the distance pieces fit to position them longitudinally of the device, the stop rings and distance pieces being provided with complementary annular grooves and flanges fitting one another to prevent outward displacement of the distance pieces; and locking rings engageable with the inner tube to hold the distance pieces and rings in place.

2. A valve according to claim 1 in which the distance pieces are provided with radial projections and the outer surface of the tube with longitudinal grooves deeper than the circumferential grooves and into which the projections fit to prevent circumferential displacement of the distance pieces.

3. A valve according to claim 1 in which the distance pieces are provided with radial projections and the outer surface of the tube with longitudinal grooves deeper than the circumferential grooves and into which the projections fit to prevent circumferential displacement of the distance pieces, the stop rings also being provided with radial projections fitting in the said longitudinal grooves and serving as abutments for the ends of the valve strips.

4. An automatic valve of the flexible strip type comprising an inner tube formed with a plurality of openings therethrough spaced longitudinally of the tube; a plurality of separate stop rings fitted on the inner tube each having a concave inner surface opposite one of the openings of the inner member and of shorter radius than that of the curved outer surface of the inner tube; a normally straight spring-valve strip arranged between each of said concave surfaces and the opposed opening in the inner tube; distance pieces positioning the stop rings and serving to position the ends of the spring-valve strips longitudinally of the device, the inner tube being provided with annular grooves into which the distance pieces fit to position them longitudinally of the device, the stop rings and distance pieces being provided with complementary annular grooves and flanges fitting one another to prevent outward displacement of the distance pieces; and locking rings provided with bayonet-joint interlocking engagement with the inner tube to hold the distance pieces and rings in place.

5. An automatic valve of the flexible strip type comprising an inner tube formed with a plurality of openings therethrough spaced longitudinally of the tube; a plurality of separate stop rings fitted on the inner tube each having a concave inner surface opposite one of the openings of the inner member and of shorter radius than that of the curved outer surface of the inner tube; a normally straight spring-valve strip arranged between each of said concave surfaces and the opposed opening in the inner tube; distance pieces positioning the stop rings and serving to position the ends of the spring-valve strips longitudinally of the device, the inner tube being provided with annular grooves into which the distance pieces fit to position them longitudinally of the device, the stop rings and distance pieces being provided with complementary annular grooves and flanges fitting one another to prevent outward displacement of the distance pieces; and means holding the tube and parts fitted thereon from relative longitudinal movement.

6. A valve according to claim 5 in which the distance pieces are provided with radial projections and the outer surface of the tube with longitudinal grooves deeper than the circumferential grooves and into which the projections fit to prevent circumferential displacement of the distance pieces.

7. A valve according to claim 5 in which the distance pieces are provided with radial projections and the outer surface of the tube with longitudinal grooves deeper than the circumferential grooves and into which the projections fit to prevent circumferential displacement of the distance pieces, the stop rings also being provided with radial projections fitting in the said longitudinal grooves and serving as abutments for the ends of the valve strips.

8. An automatic valve of the flexible strip type comprising an inner tube formed with a plurality of openings therethrough spaced longitudinally of the tube; a plurality of separate stop rings fitted on the inner tube each having a concave inner surface opposite one of the openings of the inner member and of shorter radius than that of the curved outer surface of the inner tube; a normally straight spring-valve strip arranged between each of said concave surfaces and the opposed opening in the inner tube; and distance pieces positioning the stop rings and serving to position the ends of the spring-valve strips longitudinally of the device, the outer surface of the inner tube being provided with longitudinal grooves and the distance pieces and stop rings with radial projections fitting into the said longitudinal grooves; and means holding the tube and parts fitted thereon from relative longitudinal movement.

PAUL BELYAVIN.